(12) United States Patent
Rayrole

(10) Patent No.: US 10,861,259 B2
(45) Date of Patent: Dec. 8, 2020

(54) METHOD FOR TESTING THE INTEGRITY OF THE AVIONICS OF AN AIRCRAFT, ASSOCIATED DEVICE AND COMPUTER PROGRAM PRODUCT

(71) Applicant: THALES, Courbevoie (FR)

(72) Inventor: Martin Rayrole, Velizy-Villacoublay (FR)

(73) Assignee: Thales, Courbevoie (FR)

( * ) Notice: Subject to any disclaimer, the term of this patent is extended or adjusted under 35 U.S.C. 154(b) by 198 days.

(21) Appl. No.: 16/093,649

(22) PCT Filed: Apr. 12, 2017

(86) PCT No.: PCT/EP2017/058844
§ 371 (c)(1),
(2) Date: Oct. 15, 2018

(87) PCT Pub. No.: WO2017/178550
PCT Pub. Date: Oct. 19, 2017

(65) Prior Publication Data
US 2019/0073841 A1 Mar. 7, 2019

(30) Foreign Application Priority Data

Apr. 15, 2016 (FR) ...................................... 16 00637

(51) Int. Cl.
*G07C 5/08* (2006.01)
*G05B 23/02* (2006.01)
(Continued)

(52) U.S. Cl.
CPC .............. *G07C 5/0808* (2013.01); *B64F 5/60* (2017.01); *G05B 23/0237* (2013.01);
(Continued)

(58) Field of Classification Search
CPC .... G07C 5/0808; G07C 5/0816; G07C 5/085; H04L 12/4625; H04L 2012/4028; H04L 67/12; B64F 5/60; G05B 23/0237
(Continued)

(56) References Cited

U.S. PATENT DOCUMENTS

| | | | |
|---|---|---|---|
| 6,208,955 B1 | 3/2001 | Provan et al. | |
| 2003/0074169 A1* | 4/2003 | Vanderwiel | B64F 5/60 703/6 |

(Continued)

FOREIGN PATENT DOCUMENTS

WO 2011017063 A2 2/2011

OTHER PUBLICATIONS

French Patent Application No. 16 00637, INPI Rapport de Recherche Préliminaire, mailed on Jan. 30, 2017, 2 pages.
(Continued)

*Primary Examiner* — Bao Long T Nguyen
*Assistant Examiner* — Jean W Charleston
(74) *Attorney, Agent, or Firm* — Soquel Group LLC

(57) ABSTRACT

A testing method including defining a plurality of test periods, and for each current test period collecting flight data from at least two separate avionics systems operating independently, analyzing consistency between the data collected during the previous test period, and/or between the data and flight data collected during an earlier test period, while verifying a plurality of predetermined consistency rules, and when at least one of these rules is not verified, generating an alert relative to a loss of integrity of the avionics.

9 Claims, 2 Drawing Sheets

(51) Int. Cl.
    *H04L 12/46* (2006.01)
    *B64F 5/60* (2017.01)
    *H04L 12/40* (2006.01)
    *H04L 29/08* (2006.01)
(52) U.S. Cl.
    CPC ........... *G07C 5/085* (2013.01); *G07C 5/0816* (2013.01); *H04L 12/4625* (2013.01); *H04L 67/12* (2013.01); *H04L 2012/4028* (2013.01)
(58) Field of Classification Search
    USPC ...................................................... 701/33.4
    See application file for complete search history.

(56) References Cited

U.S. PATENT DOCUMENTS

| | | | |
|---|---|---|---|
| 2010/0114410 A1 | 5/2010 | Roquelaure et al. | |
| 2010/0312420 A1* | 12/2010 | Sham ........................ | B64F 5/60 701/3 |
| 2011/0313614 A1* | 12/2011 | Hinnant, Jr. ........ | G01M 5/0041 701/33.9 |
| 2012/0001774 A1* | 1/2012 | Lyons .................... | B64D 43/00 340/974 |
| 2013/0158751 A1* | 6/2013 | Cornell ............. | H04B 7/18506 701/14 |
| 2015/0032297 A1* | 1/2015 | Loewen .................... | B64F 5/60 701/3 |
| 2016/0233948 A1* | 8/2016 | Le Bigot ............ | H04B 7/18506 |

OTHER PUBLICATIONS

PCT Rapport de Recherche Internationale, mailed on Jun. 13, 2017, 4 pages.

* cited by examiner

US 10,861,259 B2

METHOD FOR TESTING THE INTEGRITY OF THE AVIONICS OF AN AIRCRAFT, ASSOCIATED DEVICE AND COMPUTER PROGRAM PRODUCT

CROSS-REFERENCE TO RELATED APPLICATIONS

This application claims benefit under 35 USC § 371 of PCT Application No. PCT/EP2017/058844 entitled METHOD FOR TESTING THE INTEGRITY OF THE AVIONICS OF AN AIRCRAFT, ASSOCAITED DEVICE AND COMPUTER PROGAM PRODUCT, filed on Apr. 12, 2017 by inventor Martin Rayrole. PCT Application No. PCT/EP2017/058844 claims priority of French Patent Application No. 16 00637, filed on Apr. 15, 2016.

FIELD OF THE INVENTION

The present invention relates to a method for testing the integrity of the avionics of an aircraft implemented by several on board avionics systems.

The present invention also relates to a device and a computer program product associated with said testing method.

"Aircraft" refers to a moving vehicle in particular able to fly in the Earth's atmosphere, such as an airplane, helicopter or drone.

The aircraft in particular comprises the avionics usable for its operation. "Avionics" thus refers to all of the equipment and software on board an aircraft and allowing its use.

The avionics are in particular implemented by several avionics systems. "Avionics system" refers to one or several at least partially electronic devices providing a service to implement the avionics.

BACKGROUND OF THE INVENTION

In a manner known in the state of the art, the safety of the aircraft is provided by guaranteeing a high level of availability and integrity of the avionics.

This level may be deteriorated by a malfunction of one or several avionics systems. One can then see that this may lead to the general deterioration of the safety of the aircraft.

To avoid such cases, it is known to use different mechanisms for monitoring avionics systems.

In general, these monitoring mechanisms make it possible to detect a loss of integrity of at least part of the avionics by analyzing the integrity of the or each on board avionics system.

In particular, when a malfunction of such an avionics system is detected, an alert indicating a loss of integrity of the corresponding avionics part is communicated for example to the crew.

However, the existing monitoring mechanisms are not completely satisfactory. In particular, a loss of integrity of at least part of the avionics may occur whereas no malfunction of the corresponding avionics systems has been detected.

SUMMARY OF THE DESCRIPTION

The present invention aims to improve the existing monitoring mechanisms by detecting inconsistencies among several avionics systems.

To that end, the invention relates to a method for testing the integrity of the avionics of an aircraft implemented by several on board avionics systems, each avionics system being capable of providing, at a given moment, at least one flight datum corresponding to the value of a flight variable relative to the operation and/or the exploitation of the aircraft.

The method comprises the following steps:
defining a plurality of test periods;
for each current test period
collecting flight data from at least two separate avionics systems operating independently;
analyzing the consistency between the flight data collected during the previous test period, and/or between the flight data collected during the previous test period and flight data collected during at least one earlier test period, while checking a plurality of predetermined consistency rules, each rule linking at least some of the flight variables to one another, the checking of each rule being done by replacing the flight variables associated with said rule with the flight data corresponding to said variables;
when at least one of these rules is not verified, generating an alert relative to a loss of integrity of the avionics.

The test method in particular implements a consistency check for flight data supplied by various avionics systems. When a flight data inconsistency is detected, an alarm signaling a loss of integrity of the avionics is emitted.

According to other advantageous aspects of the invention, the testing method comprises one or more of the following features, considered alone or according to all technically possible combinations:

during the consistency analysis step, the verification of the rules is done according to a predetermined verification order;

the verification order of the consistency rules corresponds to the increasing order of the number of flight variables associated with said rules;

the flight data collection step consists of acquiring flight data from at least two separate avionics systems operating independently, and for each new acquired flight datum, freezing the flight data already received that correspond to flight variables on which the flight variable corresponding to said new flight datum depends;

the flight data collection step includes the following sub-steps: initializing the collection step by determining a list of expected flight data and associating, with each flight datum of this list, a reception indicator with a negative state and a change indicator with a positive state when the flight variable corresponding to said flight datum does not depend on any other flight variable, and with a negative state otherwise; implementing the reception of flight data from at least two separate avionics systems operating independently, and acquiring each new flight datum; and when the reception indicator of said flight datum is negative or when the state of the change indicator of this datum is positive, doing the following: determining a list of dependencies comprising a plurality of flight data whereof each flight datum is chosen such that the flight variable corresponding to the new flight datum depends on the flight variable corresponding to said chosen flight datum; when the state of the reception indicator of each datum from the list of dependencies is positive, storing the new flight datum, associating the positive state for the reception indicator of the new flight datum and associating the negative state for the change indicator of each flight datum of the list of dependencies;

the flight data analysis step includes the following substeps: initializing the flight data analysis step by associating, with each flight variable, an integrity indicator with a positive state; going through all of the consistency rules, and for each consistency rule, when the state of the integrity indicator of each flight variable associated with said rule is positive and when the state of the reception indicator of the flight datum corresponding to said flight variable is positive, doing the following: verifying the consistency rule by replacing each variable of said rule with the corresponding flight datum; and if the rule is not verified, associating the negative state with the integrity indicator of each flight variable associated with said consistency rule;

the alert generation step when at least one consistency rule is not verified includes communicating the set of flight variables whose integrity indicators have negative states; and the dependency between the flight variables is determined by using a predetermined dependency tree.

The invention also relates to a computer program product including software instructions which, when implemented by computer equipment, carry out a method as defined above.

The invention also relates to a device for testing the integrity of the avionics of an aircraft implemented by several on board avionics systems, each avionics system being capable of providing, at a given moment, at least one flight datum corresponding to the value of a flight variable relative to the operation and/or the exploitation of the aircraft.

The device is able to define a plurality of test periods;
for each current test period
collecting flight data from at least two separate avionics systems operating independently;
analyzing the consistency between the flight data collected during the previous test period, and/or between the flight data collected during the previous test period and flight data collected during at least one earlier test period, while checking a plurality of predetermined consistency rules, each rule linking at least some of the flight variables to one another, the checking of each rule being done by replacing the flight variables associated with said rule with the flight data corresponding to said variables;
when at least one of these rules is not verified, generating an alert.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Figure 1:
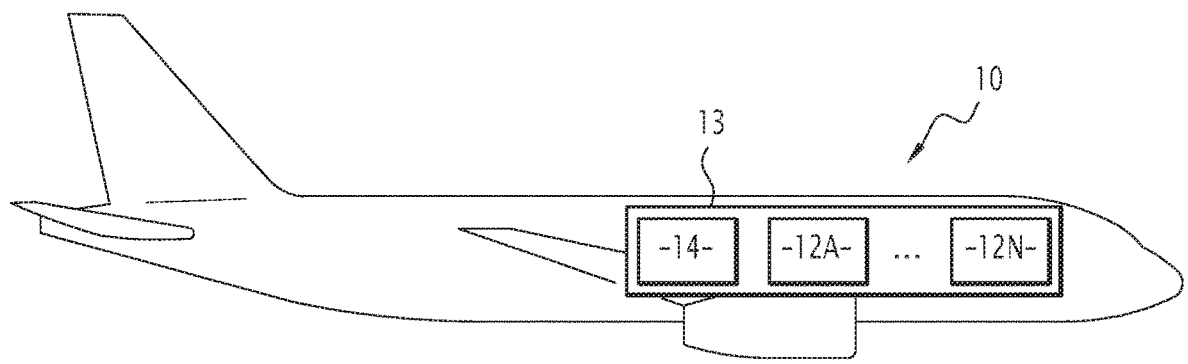
FIG. 1 is a schematic view of an aircraft in particular comprising a testing device according to the invention.

In the example embodiment of FIG. 1, the aircraft 10 is an airplane able to be piloted by at least one pilot.

Alternatively, the aircraft 10 is a helicopter or a drone.

The aircraft 10 in particular comprises avionics 13, in particular made up of a plurality of avionics systems 12A to 12N implementing the avionics 13, and a testing device 14 according to the invention.

Each avionics system 12A to 12N is able to provide a service.

The avionics 13 make it possible to operate the aircraft 10 at least partly by using the services provided by the avionics systems 12A to 12N.

Examples of avionics systems in particular include a flight management system (FMS) or a traffic alert and collision avoidance system (TCAS), a braking system or a cabin pressurization system.

Each avionics system is implemented by a set of equipment and avionics software. Examples of avionics equipment in particular include Pitot tubes, an altimeter, an inertial unit, or any other equipment performing a service.

Each avionics system 12A to 12N is capable of providing at least one flight datum at a given moment. Such a flight datum corresponds to the value of a flight variable relative to the operation and/or the exploitation of the aircraft 10.

Examples of such variables include the static pressure outside the aircraft 10, the value of which is provided by the Pitot tubes, the altitude of the aircraft, the value of which is provided by the altimeter, or positioning data provided by the inertial unit.

Each of these variables for example assumes different values during different time periods. These values are provided in the form of flight data by the corresponding avionics system 12A to 12N.

Thus for example, the values 3,000 ft, 5,000 ft and 10,000 ft provided by the altimeter at different moments have flight data corresponding to the "altitude of the aircraft 10" variable.

Among the set of avionics systems 12A to 12N implementing the avionics 13, at least two systems are separate and operate independently.

This in particular means that these two systems do not interact with one another.

The testing device 14 according to the invention makes it possible to test the integrity of the avionics 13 by carrying out a testing method described hereinafter.

Figure 2:
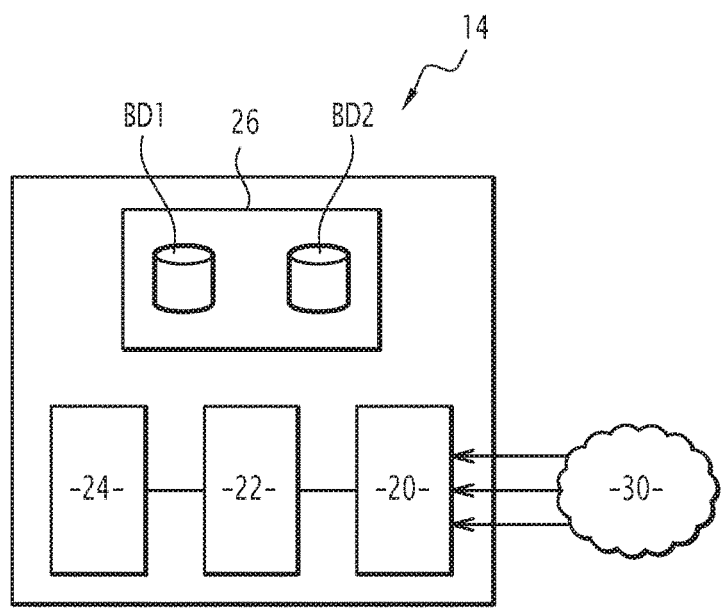
FIG. 2 is a detailed view of the testing device of FIG. 1.

The testing device 14 is illustrated in more detail in FIG. 2.

Thus, in reference to said FIG. 2, the testing device comprises a receiving module 20, an exchange module 22, an analysis module 24 and a storage module 26.

The testing device 14 for example assumes the form of an independent on board computer that is able to implement a plurality of software applications.

Alternatively, the testing device 14 is an on board computer also implementing one or several avionics services.

In both cases, the reception 20 and analysis 24 modules assume the form of software implemented by such a computer, and the exchange 22 and storage 26 modules respectively assume the form of a random-access memory and a read-only memory of this computer.

According to other example embodiments, the modules 20 to 24 assume the form of physical units such as dedicated electronic circuits (ASIC) or programmable logic circuits of the FPGA (Field-Programmable Gate Array) type.

The reception module 20 is connected to the avionics systems 12A to 12N via an avionics communication network 30.

The reception module 20 is capable of receiving flight data provided by the avionics systems 12A to 12N via the avionics communication network 30.

The avionics communication network 30 is for example configured to duplicate each flight datum useful to the analysis module 24 and circulating in said avionics communication network 30 in order to send it systematically to the reception module 20.

The reception module 20 is capable of processing the received flight data according to a step of the method described hereinafter and storing the processed flight data at least temporarily in the exchange module 22.

The analysis module 24 is capable of determining the consistency between the flight data stored in the exchange module 22 according to a step of the method described hereinafter. When the analysis module 24 determines that the data are inconsistent, it is capable of generating an alarm.

The storage module 26 stores a first database $BD_1$ and a second database $BD_2$.

The first database $BD_1$ comprises a dependency tree. This dependency tree includes, for each flight variable, a list of flight variables on which this variable depends directly.

In other words, for each flight variable, this dependency tree defines the set of variables used to calculate said variable.

Thus, for example, for the flight variable corresponding to the speed of the aircraft 10, the dependency tree of the first database $BD_1$ defines the list of variables comprising the static pressure and the dynamic pressure outside the aircraft 10 as well as the density of the air at the current altitude of the aircraft 10.

The second database $BD_2$ comprises a list of consistency rules making it possible to verify the consistency of the flight data.

In particular, each consistency rule has a relationship linking various variables to one another and/or the values of a same variable during different time periods, in particular during different testing periods $P_i$ defined hereinafter.

A rule is verified if the corresponding relationship is verified after the substitution of the flight variables associated with this rule by the flight data corresponding to these variables. Otherwise, the rule is not verified.

The first and second databases $BD_1$, $BD_2$ are for example defined in a predetermined manner during the design of the aircraft 10 and may for example be updated during a maintenance operation.

Figure 3:
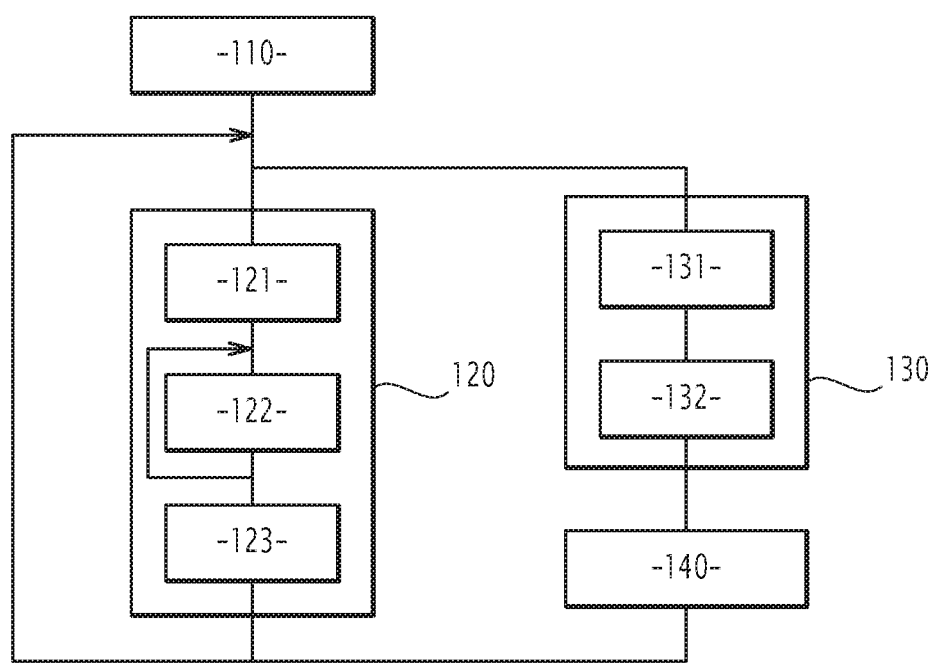
FIG. 3 is a flowchart of a testing method according to the invention, the method being carried out by the testing device of FIG. 1.

The method for testing the integrity of the avionics 13 implemented by the testing device 14 will now be explained in reference to FIG. 3, illustrating a flowchart of its steps.

During an initial step 110, a plurality of testing periods $P_i$ are determined. Each testing period $P_i$ includes a time interval for which the consistency of the flight data is determined.

The testing periods $P_i$ include consecutive time intervals of equal duration. This duration is for example equal to one second.

The initial step 110 is for example carried out once during the design phase of the testing device 14.

The following steps of the method are repeated for each current testing period $P_i$.

The collection step 120 consists of receiving flight data from at least two separate avionics systems 12A to 12N operating independently, and for each new flight datum, freezing the flight data already received that correspond to flight variables on which the flight variable corresponding to said new flight datum depends.

In particular, the collection step 120 includes several sub-steps.

During the initial sub-step 121, the reception module 20 determines, using the first database $BD_1$, a list of flight variables whose values are expected during the current testing period $P_i$.

Then, from this list of flight variables, the reception module 20 forms a list of expected flight data A.

Then, the reception module 20 associates each flight datum from the list A with a reception indicator and a change indicator.

Each of these indicators is able to assume the value of one of the states from among a positive state and a negative state.

The reception indicator is in a positive state if the flight datum with which it is associated has already been received during the current testing period $P_i$. Otherwise, the reception indicator is in the negative state.

The change indicator is in a positive state if the reception indicator 20 is authorized to change the flight datum with which said indicator is associated. Otherwise, the change indicator is in the negative state.

During this sub-step 121, the reception indicator of each flight datum from the list of expected flight data A is placed in the negative state.

During this sub-step 121, the change indicator of each flight datum from the list of expected flight data A is placed in the positive state if the flight variable corresponding to said flight datum does not depend on any other flight variable. Otherwise, said indicator is placed in the negative state.

The following sub-step 122 is implemented each time a new flight datum is acquired during the current testing period $P_i$.

In particular, during this sub-step 122, the reception module 20 determines the reception indicator and the change indicator of the new acquired flight datum.

When the state of the reception indicator of the new flight datum is positive and when the state of the change indicator of this datum is negative, the reception module 20 rejects the new flight datum.

When the state of the reception indicator of said flight datum is negative or when the state of the change indicator of this datum is positive, the reception module 20 determines a list of dependencies L comprising a plurality of flight data.

Each flight datum from this list L is chosen such that the flight variable corresponding to the new flight datum depends on the flight variable corresponding to said selected flight datum.

This list of dependencies L is established using the first database $BD_1$.

When the state of the reception indicator of each datum from the list of dependencies L is positive, the reception module 20 replaces the flight datum in the list of expected flight data A corresponding to the same flight variable as the new flight datum, with said flight datum.

Then, the reception module 20 associates the positive state with the reception indicator of the new flight datum and associates the negative state with the change indicator of each flight datum in the list of dependencies L.

During the final sub-step 123 of the step 120 implemented after the expiration of the current testing period $P_i$, the reception module sends all of the flight data collected during the current testing period $P_i$ to the exchange module 22. During this same sub-step 123, the reception module also sends the reception indicator of each collected flight datum to the exchange module 22.

The analysis step 130 implemented in parallel with step 120 consists of analyzing the consistency between the flight data collected during the previous test period $P_{i-1}$, and/or between the flight data collected during the previous test period $P_{i-1}$ and flight data collected during at least one earlier test period $P_{i-1-n}$.

This step is carried out by verifying each consistency rule from the second database $BD_2$.

In particular, the analysis step 130 includes several sub-steps.

During the initial sub-step 131, the analysis module 24 associates an integrity indicator with each flight variable.

Similarly to the reception and change indicators, two states, namely a positive state and a negative state, are defined for the integrity indicator.

An integrity indicator is in the positive state when no loss of integrity has been detected for the flight data corresponding to the variable with which said integrity indicator is associated. Otherwise, the integrity indicator is in the negative state.

During said sub-step 131, the integrity indicator of each flight variable is placed in the positive state.

During the following sub-step 132, the analysis module 24 goes through all of the consistency rules in the order in which they were defined in the second database $BD_2$ and, for each consistency rule, determines the list of flight variables V associated with said rule.

When the state of the integrity indicator of each flight variable of the list V is positive and when the state of the reception indicator of the flight datum corresponding to said flight variable is positive, the analysis module 24 verifies the consistency rule by replacing each variable of said rule with the corresponding flight datum. Each flight datum comes from the exchange module 22.

As previously indicated, each rule makes it possible to verify the consistency of the flight data from a same time period and/or different time periods. Thus, when it involves several time periods, the analysis module 24 replaces the variables with flight data received during the previous testing period $P_{i-1}$ and during at least one earlier testing period $P_{i-1-n}$.

Then, the analysis module 24 determines whether the rule is verified. When the rule is not verified, the analysis module 24 associates the negative state with the integrity indicator of each flight variable of the list V.

According to one alternative embodiment, the analysis module 24 verifies the consistency rules according to a predetermined verification order. This order for example corresponds to the increasing order of the number of variables associated with each rule.

During the following step 140 also carried out in parallel with step 120, when at least one of the consistency rules has not been verified during the previous step 130, the analysis module 24 generates an alert message relative to a loss of integrity of the avionics 13 or at least a portion thereof.

Additionally, during the same step, the set of flight variables whose integrity indicators have negative states is sent in the alert message.

The alert message is next for example communicated to a pilot of the aircraft 10 or to another avionics system of said aircraft 10.

One can then see that the present invention includes a certain number of advantages.

The integrity of the avionics is determined by analyzing the consistency of the flight data usable by the avionics. Said flight data come from separate avionics systems operating independently. Thus, when no malfunction of an avionics system has been detected by conventional monitoring mechanisms, it is possible to detect such a malfunction by analyzing the consistency of flight data produced by said system during different testing periods and/or the consistency of said data with data produced by other avionics systems.

Furthermore, the method according to the invention communicates all of the variables whose values are inconsistent. This simplifies the identification of the malfunction that has occurred, and optionally the search for a solution to return to the normal situation.

The invention claimed is:

1. A method for testing the integrity of the avionics of an aircraft implemented by several on board avionics systems, each avionics system providing, at a given moment, at least one flight datum corresponding to the value of a flight variable from a plurality of flight variables, relative to the operation and/or the exploitation of the aircraft, the method comprising:

defining a plurality of test periods; and for each current test period:

collecting flight data from at least two separate avionics systems operating independently, comprising:

initializing the collecting by determining a list of expected flight data and associating, with each flight datum of this list, a reception indicator with a negative state, and a change indicator with a positive state when the flight variable corresponding to the flight datum does not depend on any other flight variable, and with a negative state when the flight variable corresponding to the flight datum does depend on another flight variable; and implementing reception of flight data from at least two separate avionics systems operating independently and acquiring each new flight datum and, when the reception indicator of the flight datum is negative or when the state of the change indicator of the flight datum is positive, then:

determining a list of dependencies comprising a plurality of flight data whereof each flight datum is chosen such that the flight variable corresponding to the new flight datum depends on the flight variable corresponding to the chosen flight datum; and when the state of the reception indicator of each datum from the list of dependencies is positive, storing the new flight datum, associating the positive state for the reception indicator of the new flight datum and associating the negative state for the change indicator of each flight datum of the list of dependencies;

analyzing the consistency between the flight data collected during the previous test period, and/or between the flight data collected during the previous test period and flight data collected during at least one earlier test period, while verifying a plurality of predetermined consistency rules, each rule linking at least some of the flight variables to one another, the verifying of each rule comprising replacing the flight variables associated with the rule with the flight data corresponding to the variables; and when at least one of these rules is not verified, generating an alert relative to a loss of integrity of the avionics.

2. The method according to claim 1, wherein during said analyzing, verification of the rules is performed according to a predetermined verification order.

3. The method according to claim 2, wherein the verification order of the consistency rules corresponds to the increasing order of the number of flight variables associated with the rules.

4. The method according to claim 1, wherein said collecting comprises acquiring flight data from at least two separate avionics systems operating independently, and for each new acquired flight datum, freezing the flight data already received that correspond to flight variables on which the flight variable corresponding to the new flight datum depends.

5. The method according to claim 1, wherein said analyzing comprises:
 initializing said analyzing by associating, with each flight variable, an integrity indicator with a positive state; and
 going through all of the consistency rules, and for each consistency rule, when the state of the integrity indicator of each flight variable associated with the rule is positive and when the state of the reception indicator of the flight datum corresponding to the flight variable is positive, then:
  verifying the consistency rule by replacing each variable of the rule with the corresponding flight datum; and
  if the rule is not verified, associating the negative state with the integrity indicator of each flight variable associated with the consistency rule.

6. The method according to claim 5, wherein said generating an alert when at least one consistency rule is not verified comprises communicating the flight variables whose integrity indicators have negative states.

7. The method according to claim 1, wherein a dependency between the flight variables is determined by using a predetermined dependency tree.

8. A non-transitory computer readable medium storing instructions which, when executed by a processor of computer equipment, cause the processor to carry out the method according to claim 1.

9. A device for testing the integrity of the avionics of an aircraft comprising several on board avionics systems, each avionics system providing, at a given moment, at least one flight datum corresponding to the value of a flight variable from a plurality of flight variables, relative to the operation and/or the exploitation of the aircraft, the device operative to:
 define a plurality of test periods; and
 for each current test period:
  collect flight data from at least two separate avionics systems operating independently, comprising:
   initialize the collecting by determining a list of expected flight data and associate, with each flight datum of this list, a reception indicator with a negative state, and a change indicator with a positive state when the flight variable corresponding to the flight datum does not depend on any other flight variable, and with a negative state when the flight variable corresponding to the flight datum does depend on another flight variable; and
   implement the reception of flight data from at least two separate avionics systems operating independently, and acquire each new flight datum and, when the reception indicator of the flight datum is negative or when the state of the change indicator of the flight datum is positive, then:
    determine a list of dependencies comprising a plurality of flight data whereof each flight datum is chosen such that the flight variable corresponding to the new flight datum depends on the flight variable corresponding to the chosen flight datum; and
    when the state of the reception indicator of each datum from the list of dependencies is positive, store the new flight datum, associate the positive state for the reception indicator of the new flight datum, and associate the negative state for the change indicator of each flight datum of the list of dependencies;
  analyze the consistency between the flight data collected during the previous test period, and/or between the flight data collected during the previous test period and flight data collected during at least one earlier test period, while verifying a plurality of predetermined consistency rules, each rule linking at least some of the flight variables to one another, the verifying of each rule comprising replacing the flight variables associated with the rule with the flight data corresponding to the variables; and
  when at least one of these rules is not verified, generating an alert.

* * * * *